United States Patent [19]
Giebel et al.

[11] Patent Number: 5,694,917
[45] Date of Patent: Dec. 9, 1997

[54] MODULAR GRILL BODY

[75] Inventors: Michael Giebel, Joplin; Steven Speck, Neosho; Michael Franks, Neosho; Richard Davidson, Neosho, all of Mo.; Rainer B. Teufel, Colombus, Ohio

[73] Assignee: Sunbeam Products, Inc., Delray Beach, Fla.

[21] Appl. No.: 290,426

[22] Filed: Aug. 15, 1994

[51] Int. Cl.$^6$ ........................................ F24C 3/00
[52] U.S. Cl. ............................. 126/41 R; 126/25 R
[58] Field of Search ..................... 126/41 R, 25 R

[56] References Cited

U.S. PATENT DOCUMENTS

| | | |
|---|---|---|
| D. 219,629 | 12/1970 | Koziol. |
| D. 226,540 | 3/1973 | Dushek. |
| D. 231,070 | 4/1974 | Koziol. |
| D. 252,664 | 8/1979 | Hall. |
| D. 276,491 | 11/1984 | Shaper et al.. |
| D. 287,214 | 12/1986 | Koziol. |
| D. 341,292 | 11/1993 | Johnston. |
| 2,787,995 | 4/1957 | Alter ................................ 126/25 R |
| 2,933,080 | 4/1960 | Adey ................................ 126/25 R |
| 3,757,675 | 9/1973 | Wilbricht. |
| 3,938,494 | 2/1976 | Clark ................................ 126/41 R |
| 4,166,413 | 9/1979 | Meszaros ........................ 126/25 R |
| 4,989,579 | 2/1991 | Murphy et al.. |
| 5,109,834 | 5/1992 | Colins et al.. |
| 5,195,423 | 3/1993 | Beller. |

*Primary Examiner*—Carroll B. Dority
*Attorney, Agent, or Firm*—Paul D. Bangor, Jr.; Dennis M. Carleton

[57] ABSTRACT

A gas-fired barbecue grill, comprising: a grill body integrally formed with at least one side element selected from the group comprising a side table and a base member of a side burner. In another embodiment, the grill comprises a grill body and first and second side elements selected from the group comprising a side table and a base member of a side burner, wherein a first piece of the grill comprises a first portion of the grill body integrally formed with the first side element, and a second piece of the grill comprises a second portion of the grill body integrally formed with the second side element, and further wherein the first and second pieces of the grill are secured together. In yet another embodiment, the grill comprises a grill body and first and second side elements selected from the group comprising a side table and a base member of a side burner, wherein the side elements are attached directly to the grill body.

20 Claims, 8 Drawing Sheets

MODULAR GRILL BODY

FIELD OF THE INVENTION

The present invention relates to gas-fired barbecue grills and, more particularly, to an improved modular assembly therefor.

BACKGROUND OF THE INVENTION

Conventional gas-fired grills consist of a grill body containing a gas burner positioned beneath a fire grate which supports briquettes such as lava rocks. A cooking grid on which food is to be grilled is suspended above the briquettes, and heat from the burning gas is transferred to the briquettes which provides radiant heat for cooking food on the grid. In addition, virtually all prior art gas grills comprise a cart or frame assembly which supports the grill body. Horizontally extending members of the cart or frame often support side tables and/or auxiliary side burners for use in connection with the gas grill. If the grill has rollers or wheels, they are usually attached to the vertical leg members of the frame or cart.

Examples of conventional gas-fired barbecue cart or frame assemblies are shown in U.S. Pat. Nos.: 5,167,183 to Schlosser et al.; 5,109,834 to Collins et al.; 4,886,045 to Ducate, Jr., et al.; D293,067 to Stephen et al.; D276,491 to Shaper et al.; D226,540 to Dushek; and D219,629 to Koziol.

A disadvantage of such conventional gas grills is that the separate cart assembly comprises an extra structural element which not only increases the manufacturing costs of the grill, but also requires additional parts such as frame members, fasteners and washers, etc., which complicate the assembly of the grill and increase the time necessary therefor.

Accordingly, an advance in the art could be realized if an improved gas-fired grill could be developed which does not include a conventional cart or frame member for supporting the various components of the grill.

Another improvement in the art could be realized if an improved gas-fired grill could be developed which comprises a grill body and two side tables formed as a one-piece, two-piece or three-piece casting, without a distinct frame member.

Still another improvement in the art could be realized if an improved gas-fired grill could be developed which comprises a grill body, a side burner base and a side table formed as a one-piece, two-piece or three-piece casting, without a distinct frame member.

An additional improvement in the art could be realized if an improved gas-fired grill could be developed which comprises a grill body and any number of side burner base members and/or side tables formed as a one-piece, two-piece or three-piece casting, without a distinct frame member.

SUMMARY OF THE INVENTION

It is a principal object of this invention to provide a new and improved gas-fired barbecue grill that avoids the aforementioned shortcomings of the prior art.

Another object of the present invention is to provide an improved gas-fired grill which comprises a grill body and two side tables formed as a one-piece, two-piece or three-piece casting, without a distinct frame member.

Yet an additional object of the present invention is to provide an improved gas-fired grill which comprises a grill body, a side burner base and a side table formed as a one-piece, two-piece or three-piece casting, without a distinct frame member.

In accordance with the present invention, there is provided a gas-fired barbecue grill comprising a grill body which defines a grill compartment, an auxiliary side burner and a side table. The grill also comprises a hood base disposed on top of the grill body; the hood base having a hood pivotally mounted thereto for providing access to the cooking grid. Warming racks disposed between the side members of the hood may also be provided, as well as a steamer/smoker tray supported on embosses just below the cooking grid.

In a preferred embodiment of the invention, the grill body, side burner and side table are cast in one piece.

In another preferred embodiment of the invention, the grill body, side burner and side table are cast in two pieces that are connected together after casting; one piece comprising the side burner and a portion of the grill body and the other piece comprising the mating portion of the grill body and the side table.

In yet a further preferred embodiment of the invention, the grill body, side burner and side table are cast in three separate pieces with the side table and side burner base member attached directly to the grill body.

In still another preferred embodiment of the invention, the grill body and two side tables, one on each side of the grill body, are cast in one piece.

In an additional preferred embodiment of the invention, the grill body and two side tables, one on each side of the grill body, are cast in two pieces, which are connected together after casting by bolts or other means; one piece comprising a side table and a portion of the grill body, and the other piece comprising the mating portion of the grill body and the other side table.

In still another preferred embodiment of the invention, the grill body and two side tables, one side table attached to each side of the grill body, are cast in three separate pieces.

These and other features and advantages of the preferred embodiments of the present invention will become readily apparent from the following detailed description of the preferred embodiments, the claims appended hereto, and from the accompanying drawings illustrating the preferred embodiments of the present invention.

BRIEF DESCRIPTION OF THE DRAWINGS

In the accompanying drawings, the preferred embodiments of the invention are illustrated in which.

DETAILED DESCRIPTION OF THE PREFERRED EMBODIMENTS

Figure 1:
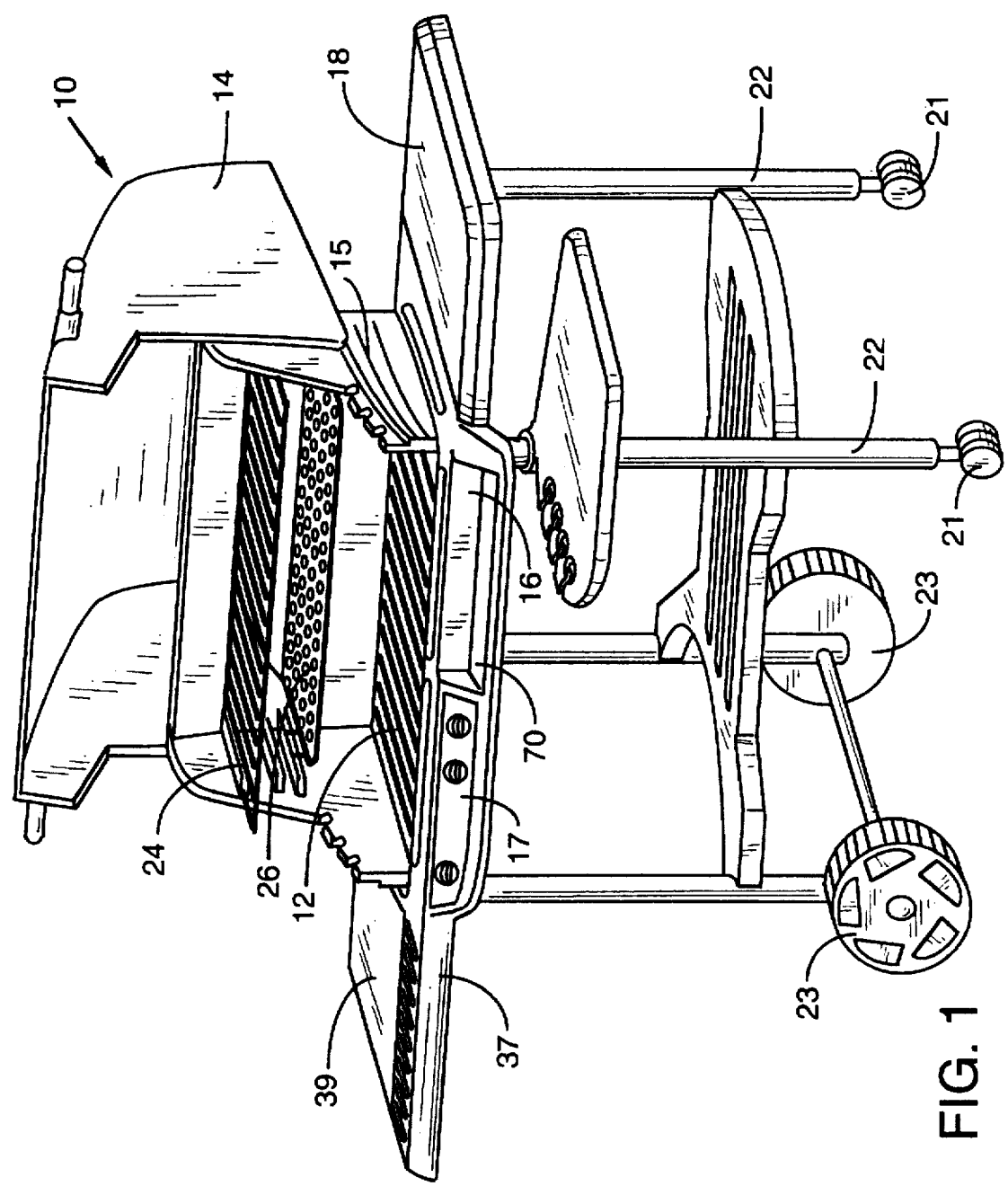
FIG. 1 is a front perspective view of the modular barbecue grill of the present invention.
Figure 2:
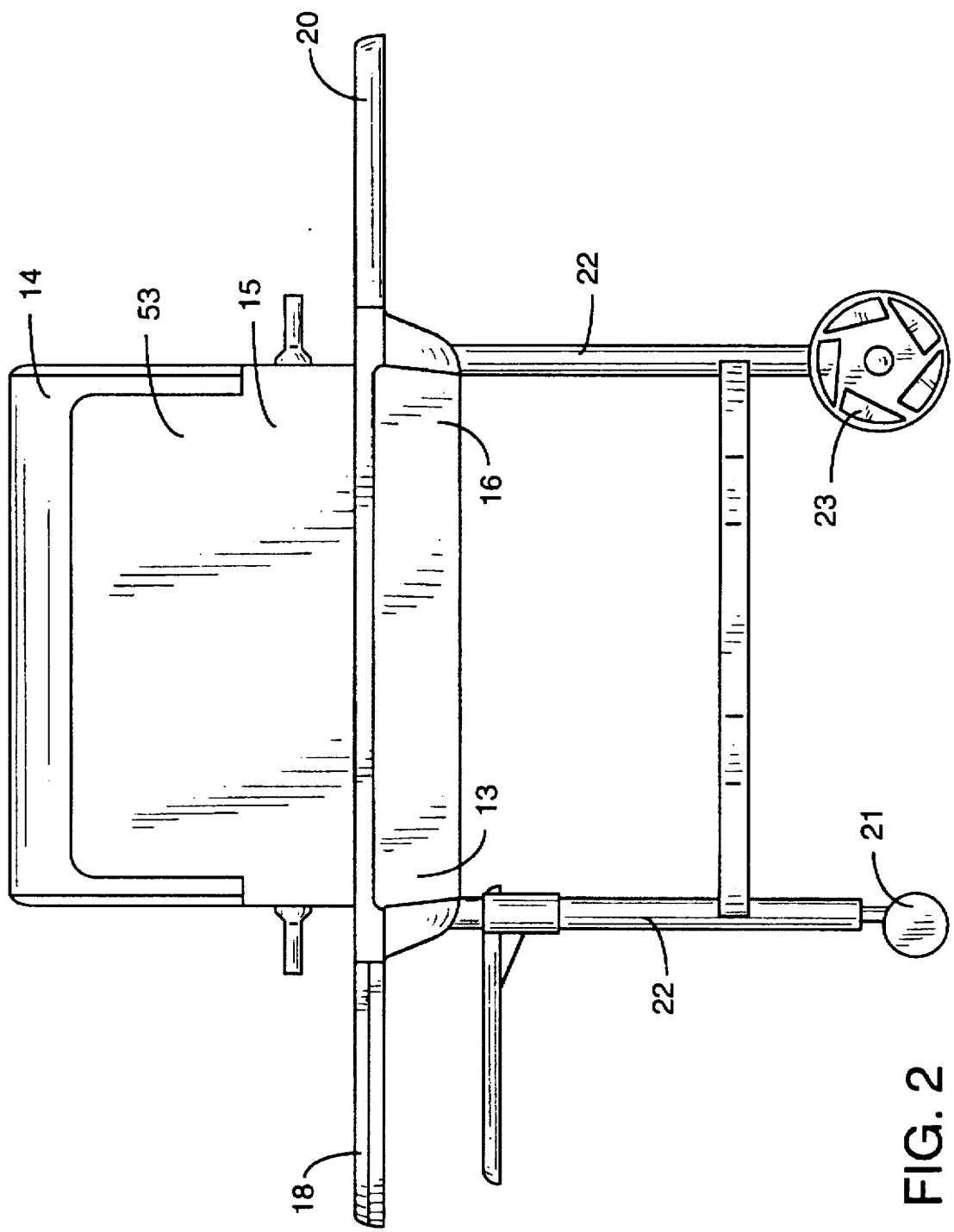
FIG. 2 is a rear elevational view of the modular barbecue grill of the present invention.

Referring now to FIGS. 1 and 2, a gas-fired barbecue grill 10 of a new modular construction is shown wherein the frame or chassis normally found in conventional gas grills has been replaced by modular components. For example, the gas grill 10 shown in FIG. 1 has no horizontal, tubular frame members. Tubular legs 22 are separately attached to the grill body 16 and do not form a conventional grill cart. Instead, the gas grill 10 comprises a grill body 16 defining a large upwardly facing grill compartment 30 having opposing front and rear walls 32 and 33, respectively, as well as opposing side walls 34.

As is known in the art, the grill compartment houses a main gas burner positioned beneath a fire grate which supports briquettes, such as lava rocks or ceramic tiles, or other means for retaining thermal energy (all of which have not been shown). A main cooking grid 12 is suspended on embosses or projections 31 in the front and rear walls 32 and 33, above the briquettes, and heat from the burning gas is transferred to the briquettes which provides radiant heat for cooking food on the main cooking grid 12.

Extending downwardly from the underside of the grill body 16 are hollow, frustum projections 40 having an aperture 41. The upper ends of hollow tubular legs 22 are fit over frustum projections 40 and a cotter pin or other fastener is inserted through a hole in the leg 22 and through aperture 41 to secure each leg 22 to the grill body 16. Rollers 21 or wheels 23 may be disposed on the other ends of legs 22. Such construction eliminates the need for spaced-apart, horizontal frame members for supporting the main grill body and side elements, such as side table 18 and side burner 20, normally found in conventional grill cart assemblies.

Figure 5:
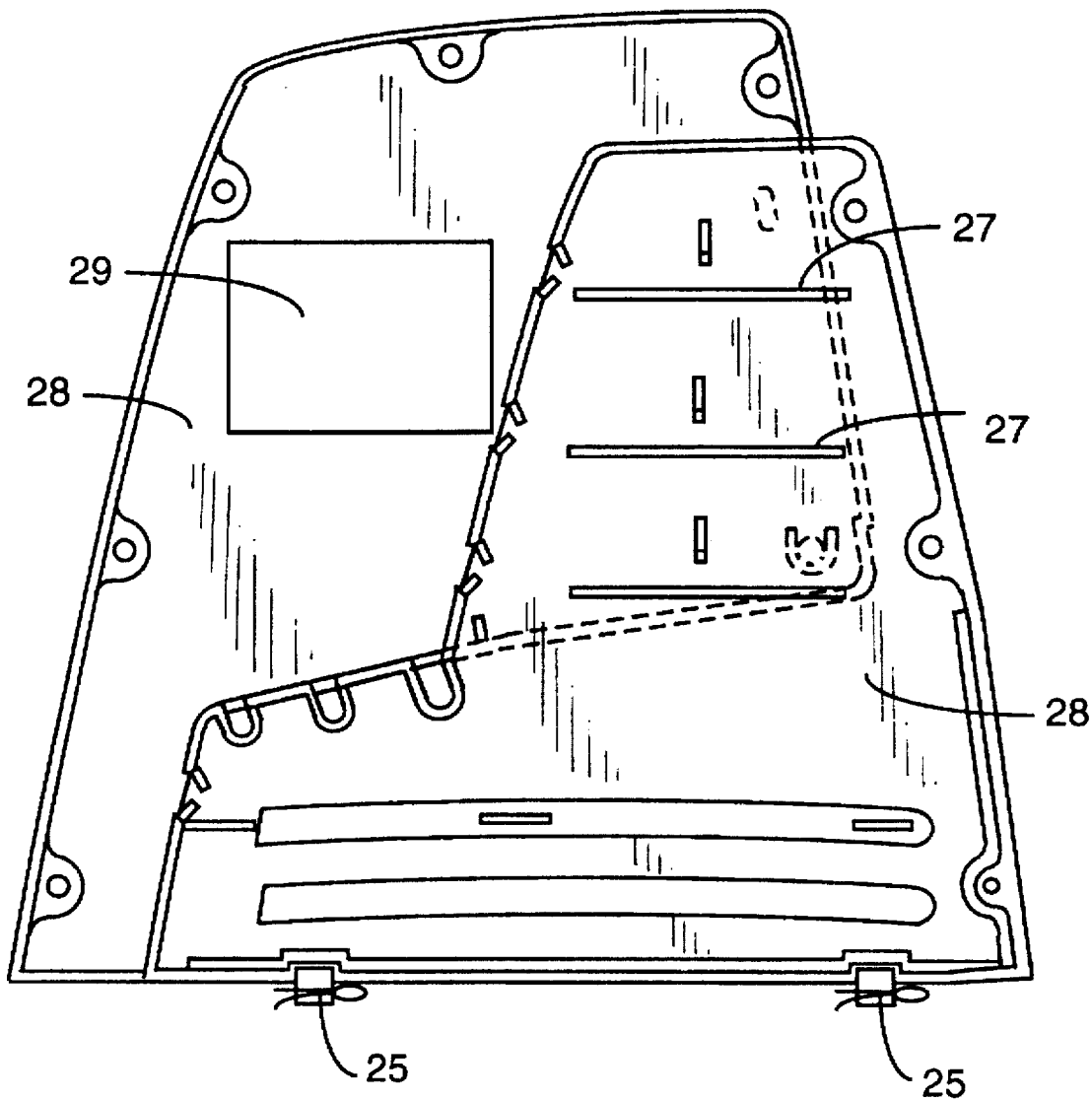
FIG. 5 is a side perspective view of the hood base of the modular barbecue grill of the present invention.

The grill 10 also comprises a hood base 15, as shown in FIG. 5. The hood base 15 has lugs or projections 25 which fit into holes 19 in the upper surface of grill body 16. Cotter pins or other fasteners can then be used to secure the hood base 15 on grill body 16 as shown in FIGS. 1, 2 and 5. The hood base 15 has opposing side members 28 and a rear wall 53. Referring to FIGS. 1 and 5, the hood base 15 may include one or more warming racks, such as upper and lower warming racks 24 and 26, respectively, slideably received within complimentary flanges 27 disposed on side members 28. In addition, a window 29 is preferably disposed in one of the side members 28. As shown in FIG. 1, either of the warming racks 24, 26 may be made from a metal sheet having a plurality of holes in its surface for cooking foods which are delicate and have a tendency for falling through a conventional cooking grid comprising parallel bars. A hood 14 is pivotally mounted to the hood base 15 so that it is capable of being opened with respect to the cooking grid 12, thereby exposing the cooking grid 12 for access by a user of the grill 10.

Figure 8:
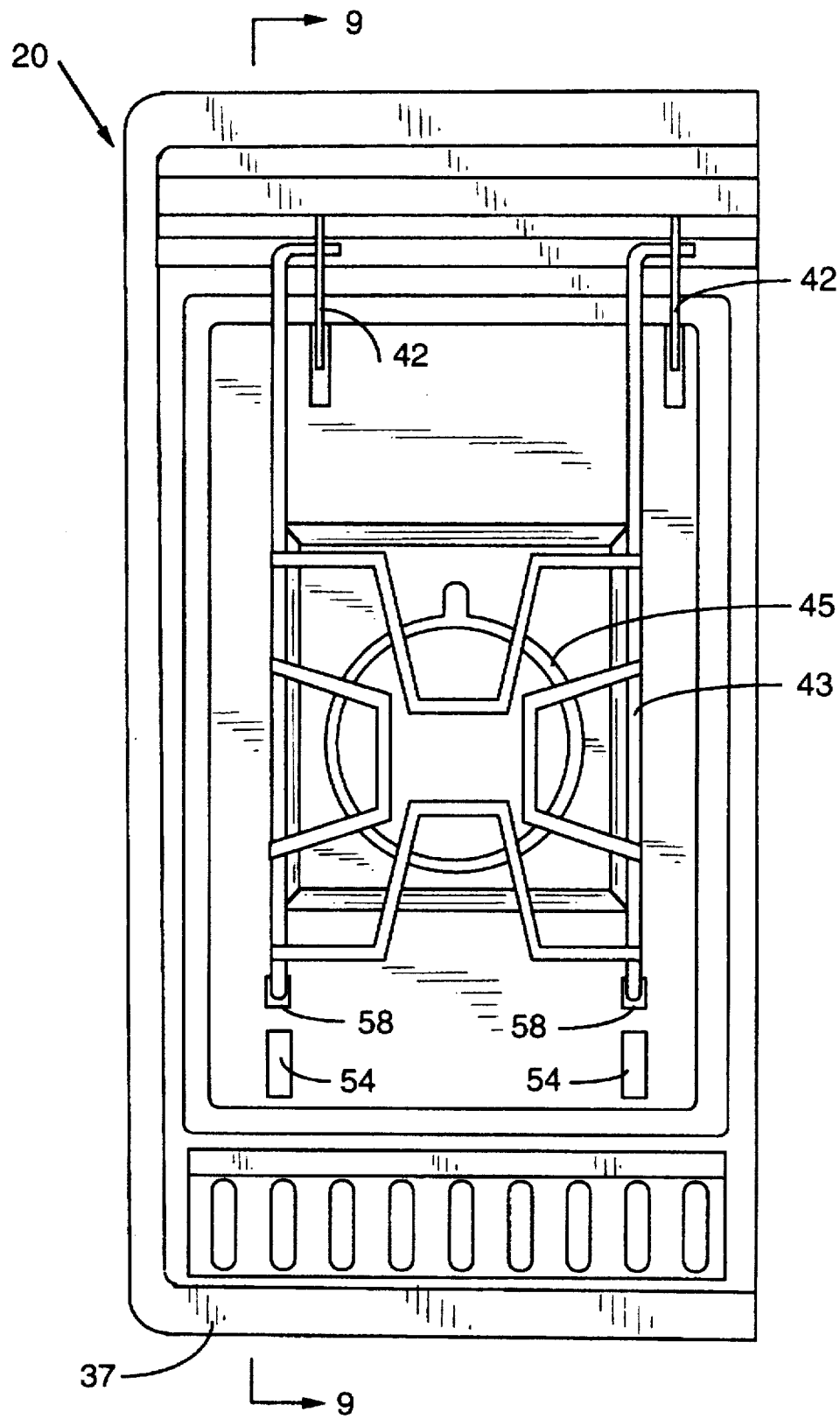
FIG. 8 is a top plan view of the side burner of the present invention with its lid open showing the articulating cooking grid of the side burner in its operable position.
Figure 9:
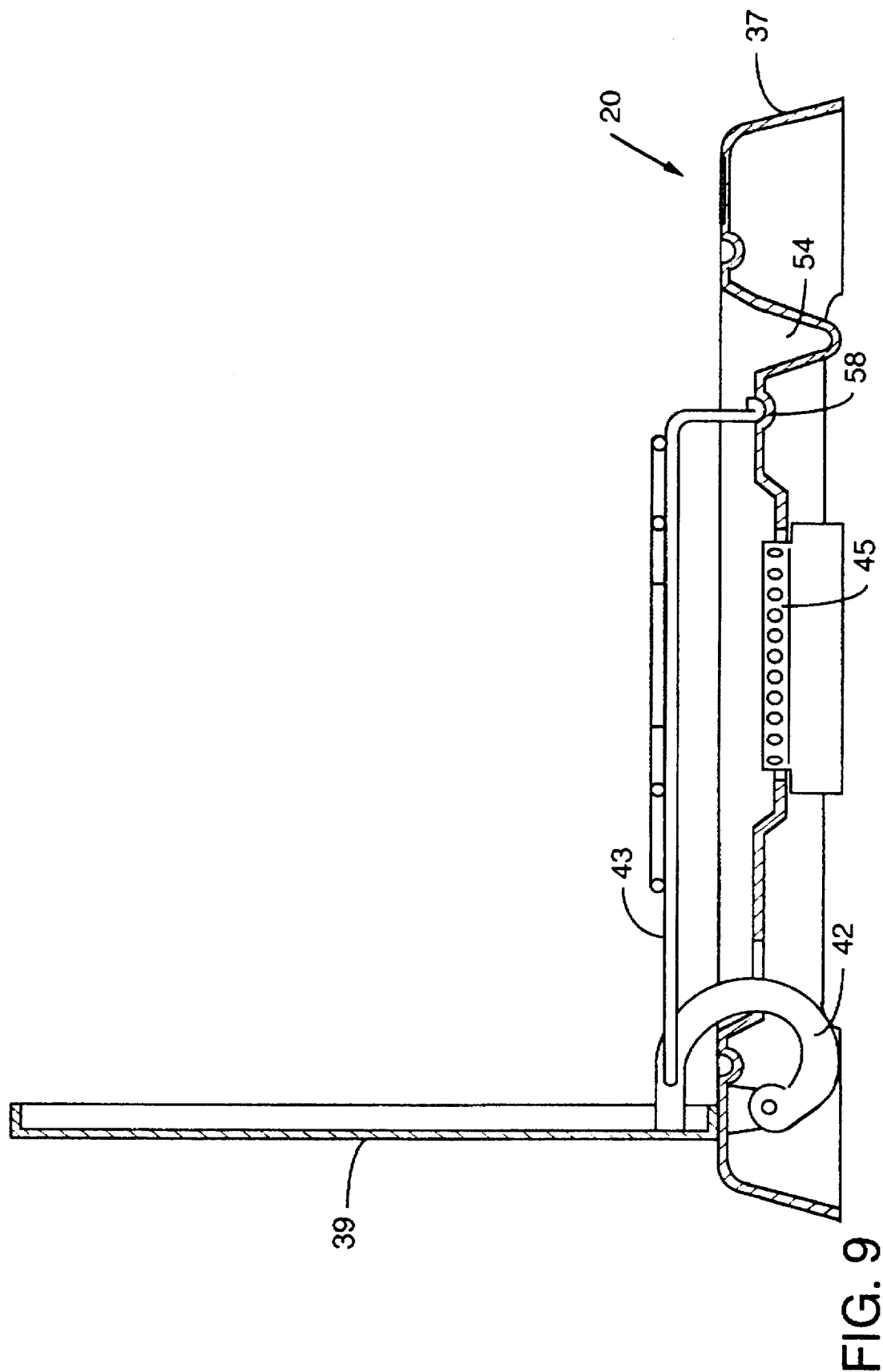
FIG. 9 is a cross-sectional view of the side burner of the present invention along Line 5—5 of FIG. 8.

Referring again to FIGS. 1 and 2, the grill 10 comprises grill body 16 defining a control panel 17 and having a back surface 13, and side elements such as a side table 18 and auxiliary side burner 20 having a base member 37. As shown in FIG. 1, a shelf 70 may be defined by the grill body 16. The base member 37 houses burner unit 45 and defines deep depressions 54 and shallow depressions 58. As illustrated in FIGS. 8 and 9, the side burner 20 comprises a base member 37, a lid 39 pivotally connected to the base member 37 by curved or U-shaped hinges 42, an articulating cooking grid 43 connected to the hinges 42. The grid 43 is movable between a first position when the lid 39 is closed, and a second, operable position when lid 39 is open. In a preferred embodiment, the grill body 16, side table 18 and base member 37 of side burner 20 are cast as one piece, preferably from aluminum.

Figure 3:
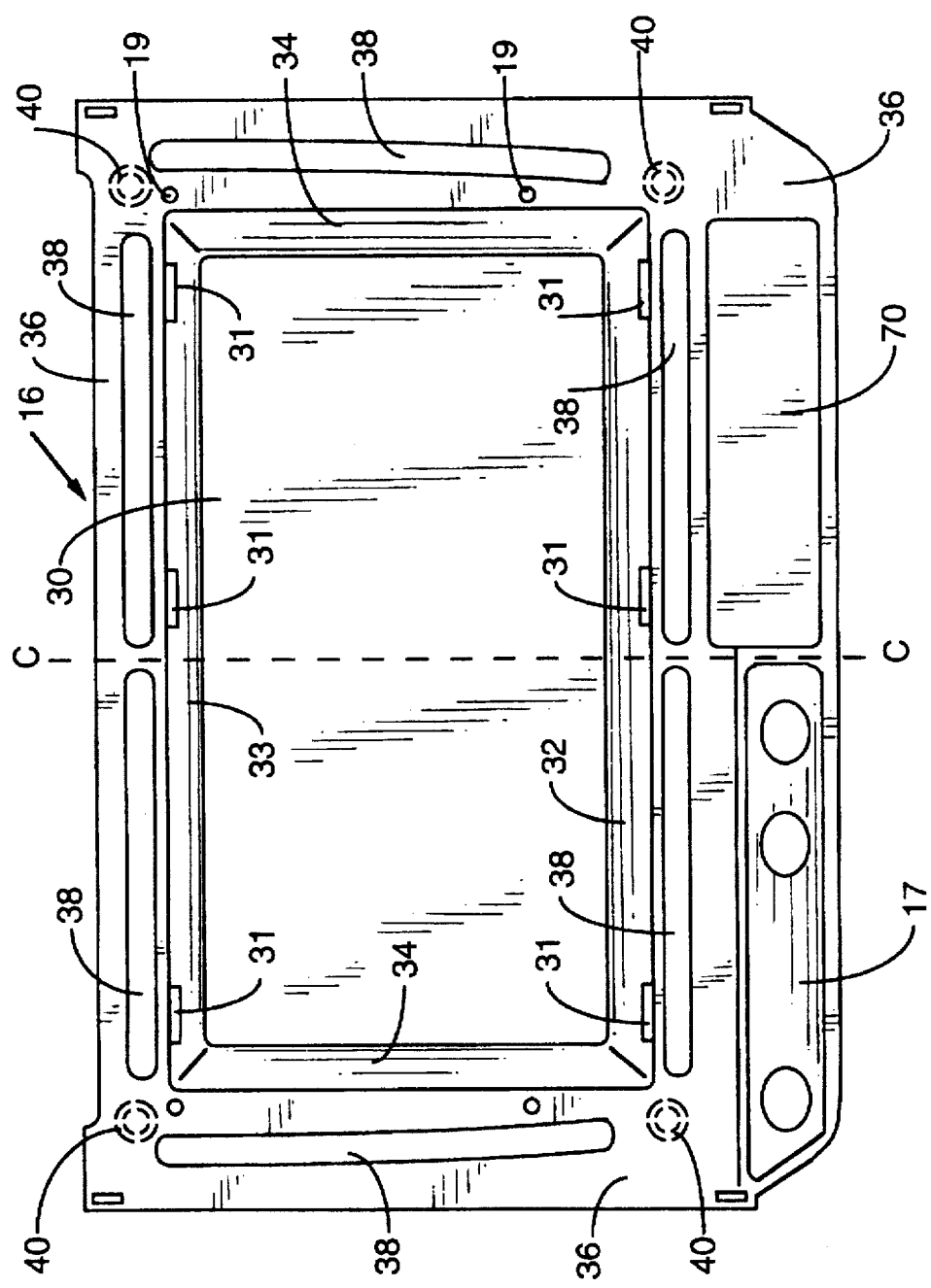
FIG. 3 is a top plan view of the grill body of the modular barbecue grill of the present invention.

In another preferred embodiment, the grill body 16, side table 18 and side burner 20 are cast, again preferably from aluminum, as two pieces and connected together after casting by bolts or other fasteners. In this embodiment, the casting line where the two pieces are joined together runs along line C—C down the center of the grill body 16 from the front wall 32 to rear wall 33, as shown in FIG. 3. In other words, one of the two cast pieces comprises the base 37 of side burner 20 integrally formed with half of the grill body 16. The second cast piece would then comprise the other half of grill body 16 integrally formed with the side table 18.

In yet another preferred embodiment, the grill body 16, side table 18 and side burner 20 are cast, again preferably from aluminum, as two pieces. In this embodiment, the casting line where the two pieces are joined together runs down the line C—C, as shown in FIG. 3. However, in this embodiment line C—C does not dissect the grill body 16 at its center. Depending on the size or volume desired for grill body 16, either cast piece may comprise more than half of the volume of grill body 16. In this embodiment, therefore, the grill 10 would comprise one large cast piece and one small cast piece connected together after casting. For example, one piece might comprise the base 37 of side burner 20 integrally formed with forty per cent of the volume of grill body 16. In this case, the mating piece would comprise the other sixty percent of the volume of the grill body 16 integrally formed with the side table 18. As is now evident, the volumetric proportions of the grill body 16 which the two cast pieces respectively comprise can be varied accordingly to meet any number of requirements, such as with respect to the manufacturing, shipping and/or assembly of the grill 10, etc.

Figure 4:
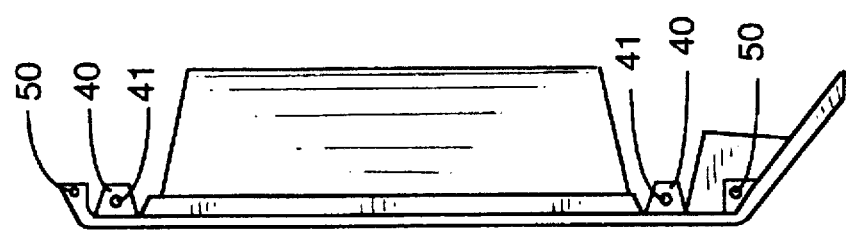
FIG. 4 is a side elevational view of the grill body of the modular barbecue grill of the present invention.

In still another preferred embodiment, the grill body 16, side table 18 and side burner 20 are cast, again preferably from aluminum, as three pieces. In this embodiment, one piece comprises the grill body 16, shown in FIGS. 3 and 4. The base member 37 of side burner 20 and the side table 18 comprise the other two cast pieces of this preferred embodiment, and they are attached directly to the grill body 16. As shown in FIG. 4, the grill body 16 defines holes 50 for mounting the side burner base member 37 and the side table 18 using cotter pins, bolts or other fasteners known in the art.

In all embodiments where the grill 10 is to be cast in more than one piece, the mating edges of the pieces are preferably configured to provide a tight seal so that no ashes, grease or juices leak from the grill body 16. One preferable configuration would comprise a convex V-shaped or male mating edge on one cast piece, and a concave V-shaped or female mating edge on the other cast piece. In this manner a tight seal is obtained when the pieces are bolted or otherwise secured together.

In addition, insulation slots 38, defining air spaces or containing other insulation material, are defined by the grill body 16 and/or by flange 36 at various around the periphery of grill body 16 to reduce the transfer of heat from the grill body 16 to the side burner base 37, side table 18, control panel 17 and/or to the back surface 13 of grill body 16. In this manner, the side burner 20, side table 18, control panel 17 and the back surface 13 remain relatively cool when the grill 10 is fired for cooking.

Figure 6:
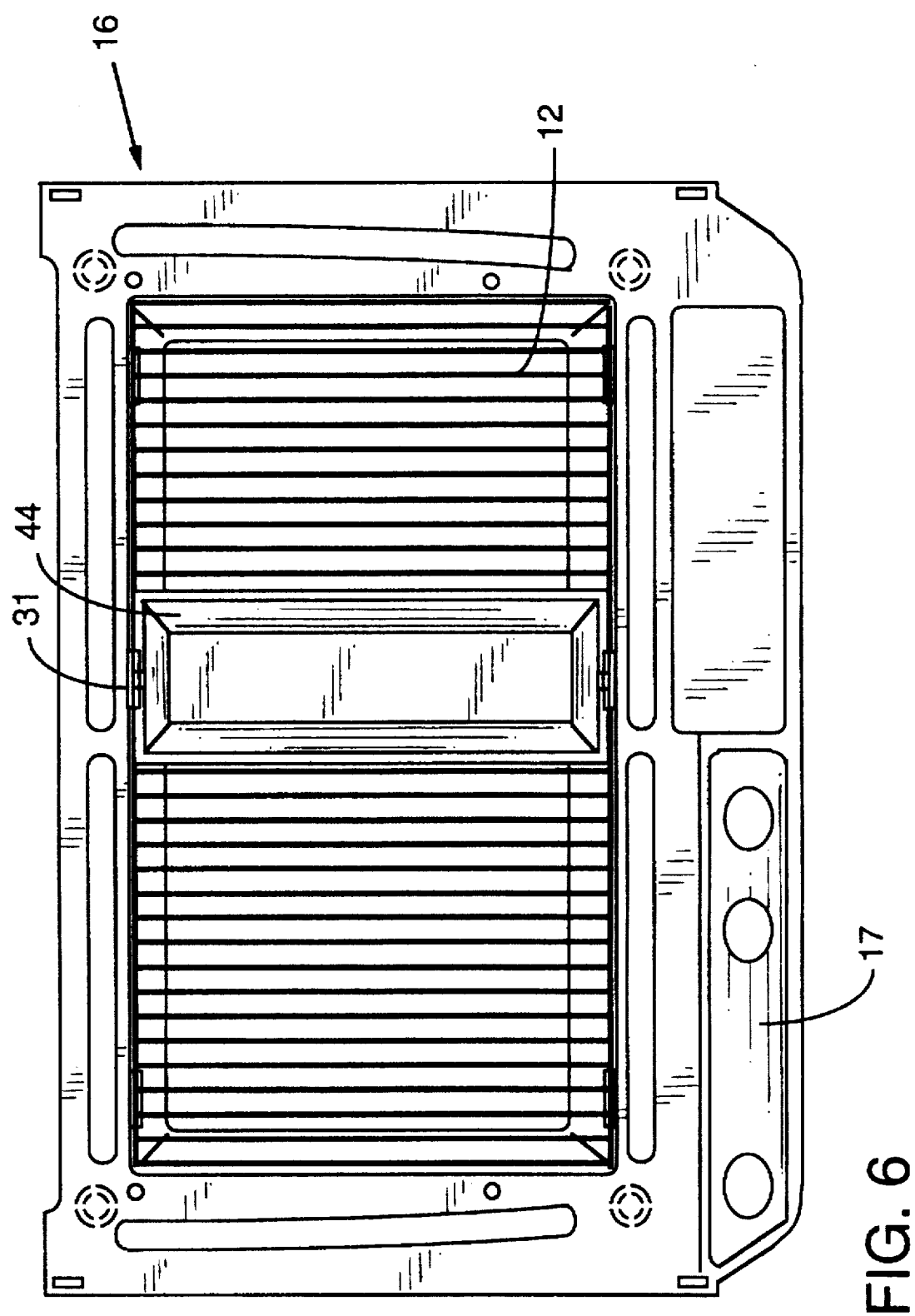
FIG. 6 is a top plan view of the grill body of the modular barbecue grill with the cooking grid partially cut-away to show the placement of the steamer/smoker tray of the present invention.
Figure 7:
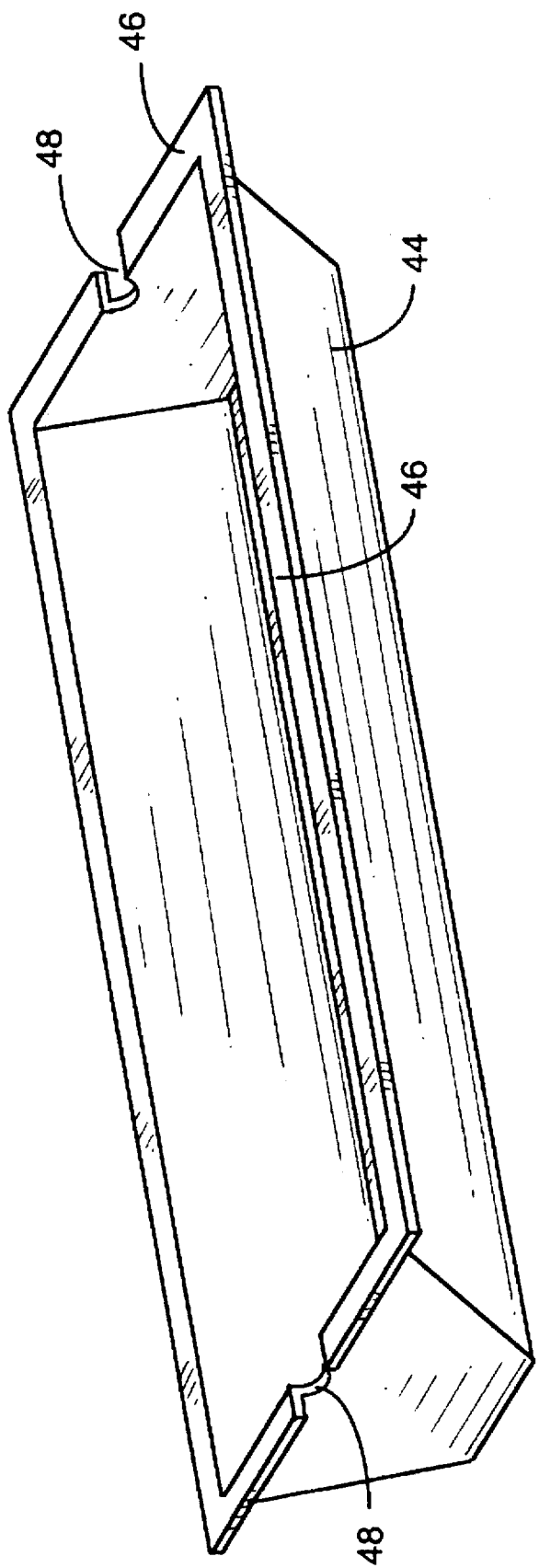
FIG. 7 is a side perspective view of the steamer/smoker tray of the present invention.

Referring now to FIGS. 3, 6 and 7, a steamer/smoker tray 44 may also be provided with the grill 10 of the present invention. The tray 44 has a flange 46 around its periphery which defines openings 48 in two opposing sides. The openings 48 are narrower than the width of the embosses 31 which support the tray 44 within the grill compartment 30 just below the cooking grid 12, as shown in FIG. 6. The tray 44 may be used when the grill 10 is fired and foods are being cooked on cooking grid 12. More specifically, the tray 44 may be filled with water, which when heated during the operation of grill 10, produces steam and/or water vapor within the environment defined by the grill compartment 30, hood base 15 and hood 14. Alternatively, the tray 44 may be filled with wood chips for producing smoke, when heated during the grilling operation, for flavoring the foods being cooked on cooking grid 12.

Although the invention has been described in detail in the foregoing for the purpose of illustration, it is to be understood that such detail is solely for that purpose and that variations can be made therein by those of ordinary skill in the art without departing from the spirit and scope of the invention as defined by the following claims, including all equivalents thereof.

We claim:

1. A grill comprising: a grill body homogeneously formed with at least one side element selected from the group comprising a side table and a base member of a side burner wherein said grill body defines a grill compartment.

2. The grill of claim 1 wherein the means for limiting the transfer of heat comprises at least one slot defined in said grill body adjacent said grill compartment.

3. The grill of claim 1 wherein said grill body homogeneously cast with at least one side element is cast of aluminum.

4. A grill, comprising: a grill body integrally formed with at least one side element selected from the group comprising a side table and a base member of a side burner, wherein said grill body defines at least one insulation slot and wherein said grill body defines a grill compartment for housing a gas burner disposed below a cooking grid supported on projections defined by said grill body, and wherein said grill also comprises a tray supported below said cooking grid on said projections.

5. The grill of claim 1 wherein said grill body defines a plurality of frustum-shaped projections for securing a plurality of legs to said grill body.

6. A grill, comprising: a grill body and first and second side elements selected from the group comprising a side table and a base member of a side burner, wherein a first piece of said grill comprises a first portion of said grill body homogeneously cast with said first side element, and a second piece of said grill comprises a second portion of said grill body homogeneously cast with said second side element, and further wherein said first and second pieces of said grill are secured together and wherein said grill body defines a grill compartment.

7. The grill of claim 6 further comprising an insulating region for limiting the transfer of heat from the grill compartment to at least one of the side elements.

8. The grill of claim 7 wherein the insulating region for limiting the transfer of heat comprises at least one slot defined in said grill body, adjacent said grill compartment.

9. The grill of claim 6 wherein said grill body homogeneously cast with side elements is cast of aluminum.

10. A grill, comprising: a grill body and first and second side elements selected from the group comprising a side table and a base member of a side burner, wherein a first piece of said grill comprises a first portion of said grill body homogeneously cast with said first side element, and a second piece of said grill comprises a second portion of said grill body homogeneously cast with said second side element, said first and second pieces of said grill body being secured together, wherein said grill body defines at least one insulation slot and wherein said grill body defines a grill compartment for housing a gas burner disposed below a cooking grid supported on projections defined by said grill body, and wherein said grill also comprises a tray supported below said cooking grid on said projections.

11. The grill of claim 6 wherein said grill body defines a plurality of frustum-shaped projections for securing a plurality of legs to said grill body.

12. A grill, comprising: a grill body and a side element selected from the group comprising a side table and a base member of a side burner, wherein a first piece of said grill comprises a first portion of said grill body homogeneously cast with said side element, and a second piece of said grill comprises a second cast portion of said grill body, wherein said first and second pieces of said grill are secured together and wherein said grill body defines a grill compartment.

13. The grill of claim 12 further comprising means for limiting the transfer of heat from the grill compartment to the side element.

14. The grill of claim 13 wherein the means for limiting the transfer of heat comprises at least one slot defined in said grill body adjacent to said grill compartment.

15. The grill of claim 12 wherein said grill body homogeneously cast with one of said elements is cast of aluminum.

16. A grill, comprising: a grill body and a side element selected from the group comprising a side table and a base member of a side burner, wherein a first piece of said grill comprises a first portion of said grill body integrally formed with said side element, and a second piece of said grill comprises a second portion of said grill body, and further wherein said first and second pieces of said grill are secured together and wherein said grill body defines at least one insulation slot and said grill body defines a grill compartment for housing a gas burner disposed below a cooking grid supported on projections defined by said grill body, and wherein said grill also comprises a tray supported below said cooking grid on said projections.

17. The grill of claim 12 wherein said grill body defines a plurality of frustum-shaped projections for securing a plurality of legs to said grill body.

18. A grill, comprising: a grill body and first and second side elements selected from the group comprising a side table and a base member of a side burner, wherein said side elements are attached directly to said grill body and wherein said grill body defines at least one insulation slot and said grill body defines a grill compartment for housing a gas burner disposed below a cooking grid supported on projections defined by said grill body, and wherein said grill also comprises a tray supported below said cooking grid on said projections.

19. A grill, comprising: a grill body and first and second side elements selected from the group comprising a side table and a base member of a side burner, wherein a first piece of said grill comprises a first portion of said grill body homogeneously formed with said first side element, and a second piece of said grill comprises a second portion of said grill body homogeneously formed with said second side element and wherein said grill body defines a grill compartment for housing a gas burner disposed below a cooking grid supported on projections defined by said grill body and wherein said grill also compromises a tray supported below said cooking grid on said projections.

20. A grill, comprising: a grill body and first and second side elements selected from the group comprising a side table and a base member of a side burner, wherein a first piece of said grill comprises a first portion of said grill body and homogeneously formed with said first side element, and a second piece of said grill comprises a second portion of said grill body homogeneously formed with said second side element, wherein said grill body defines at least one insulation slot and wherein said grill body defines a grill compartment for housing a gas burner disposed below a cooking grid supported on projections defined by said grill body, and wherein said grill also comprises a tray supported below said cooking grid on said projections.

* * * * *